(12) United States Patent
Simmons

(10) Patent No.: US 10,698,490 B2
(45) Date of Patent: Jun. 30, 2020

(54) HAPTIC FEEDBACK DEVICE, METHOD AND SYSTEM

(71) Applicant: Jonathan Fraser Simmons, San Francisco, CA (US)

(72) Inventor: Jonathan Fraser Simmons, San Francisco, CA (US)

(*) Notice: Subject to any disclaimer, the term of this patent is extended or adjusted under 35 U.S.C. 154(b) by 0 days.

(21) Appl. No.: 16/243,406

(22) Filed: Jan. 9, 2019

(65) Prior Publication Data

US 2019/0212825 A1 Jul. 11, 2019

Related U.S. Application Data

(60) Provisional application No. 62/615,587, filed on Jan. 10, 2018.

(51) Int. Cl.
*G06F 3/01* (2006.01)
*G06F 3/0346* (2013.01)

(52) U.S. Cl.
CPC .............. *G06F 3/016* (2013.01); *G06F 3/011* (2013.01); *G06F 3/0346* (2013.01)

(58) Field of Classification Search
CPC ......... G06F 3/016; G06F 3/0346; G06F 3/011
See application file for complete search history.

(56) References Cited

U.S. PATENT DOCUMENTS

| 2007/0182711 | A1* | 8/2007 | Grant | H04M 1/24 345/156 |
| 2014/0327642 | A1* | 11/2014 | Norieda | G06F 3/01 345/173 |
| 2017/0228028 | A1* | 8/2017 | Nakamura | G06F 3/014 |
| 2018/0200619 | A1* | 7/2018 | Guillotel | A63F 13/285 |
| 2019/0098122 | A1* | 3/2019 | Harrison | G05B 9/02 |
| 2019/0212838 | A1* | 7/2019 | Takeda | G08B 6/00 |

OTHER PUBLICATIONS

Amemiya et al., "Buru-Navi3: Behavioral Navigations Using Illusory Pulled Sensation Created by Thumb-sized Vibrator", NTT Communication Science Laboratories, Retrieved from: <<https://www.youtube.com/watch?v=m1PHtzGeXrg>>, Jul. 28, 2014, 3 pages.

(Continued)

*Primary Examiner* — Dmitriy Bolotin
(74) *Attorney, Agent, or Firm* — Faegre Drinker Biddle & Reath LLP

(57) ABSTRACT

A haptic feedback device comprises a body having one or more movable components. The haptic feedback device also comprises a controller configured to move the one or more movable components in response to control signals received from a processor, the control signals generated based on a state of interaction between a user and a virtual environment, to shift a center of gravity of the haptic feedback device so as to impart particular haptic sensations to the user corresponding to the state of interaction between the user and the virtual environment. The controller is also configured to dynamically adjust respective positions of one or more of the movable components to dynamically shift the center of gravity of the haptic feedback device based on changes in a physical state of the haptic feedback device as the user physically manipulates the haptic feedback device.

20 Claims, 16 Drawing Sheets

(56) References Cited

OTHER PUBLICATIONS

Zenner et al., "Shifty: A Weight-Shifting Dynamic Passive Haptic Proxy to Enhance Object Perception in Virtual Reality," Retrieved from: <<https://www.dfki.de/fileadmin/user_upload/import/8925_Shifty-TVCG2656978-Author-Version.pdf>>, Jan. 25, 2017, 10 pages.

Schneider et al., "Haptic Feedback Through Weight Shifting," Retrieved from: <<https://www.uni-weimar.de/fileadmin/user/fak/medien/professuren/Virtual_Reality/documents/publications/vr2005-haptic-feedback.pdf>>, 2005, 4 pages.

Lang, "Hands-on: HaptX's VR Glove is the Closest I've Come to Touching the Virtual World," Retrieved from: <<https://www.roadtovr.com/haptx-vr-force-feedback-glove-touching-the-virtual-world/2/>>, Oct. 26, 2018, 3 pages.

Nyoibo (Peso dinamico), Retrieved from: <<https://www.youtube.com/watch?v=bOOxktdh6Gc>>, Sep. 20, 2017, 4 pages.

Feltham, "This VR Controler Mod Shifts Weight to Simulate Objects," Retrieved from: <<https://uploadvr.com/vr-controller-mod-shifts-weight-simulate-objects/>>, Feb. 12, 2018, 3 pages.

Shigeyama et al., "Transcalibur: Weight Moving VR Controller for Dynamic Rendering of 2D Shape using Haptic Shape Illusion," Siggraph 18 Emerging Technologies, Retrieved from: <<http://www.cyber.t.u-tokyo.ac.jp/~jotaro/transcalibur_web/downloads/paper.pdf>>, Aug. 12-16, 2018, 2 pages.

* cited by examiner

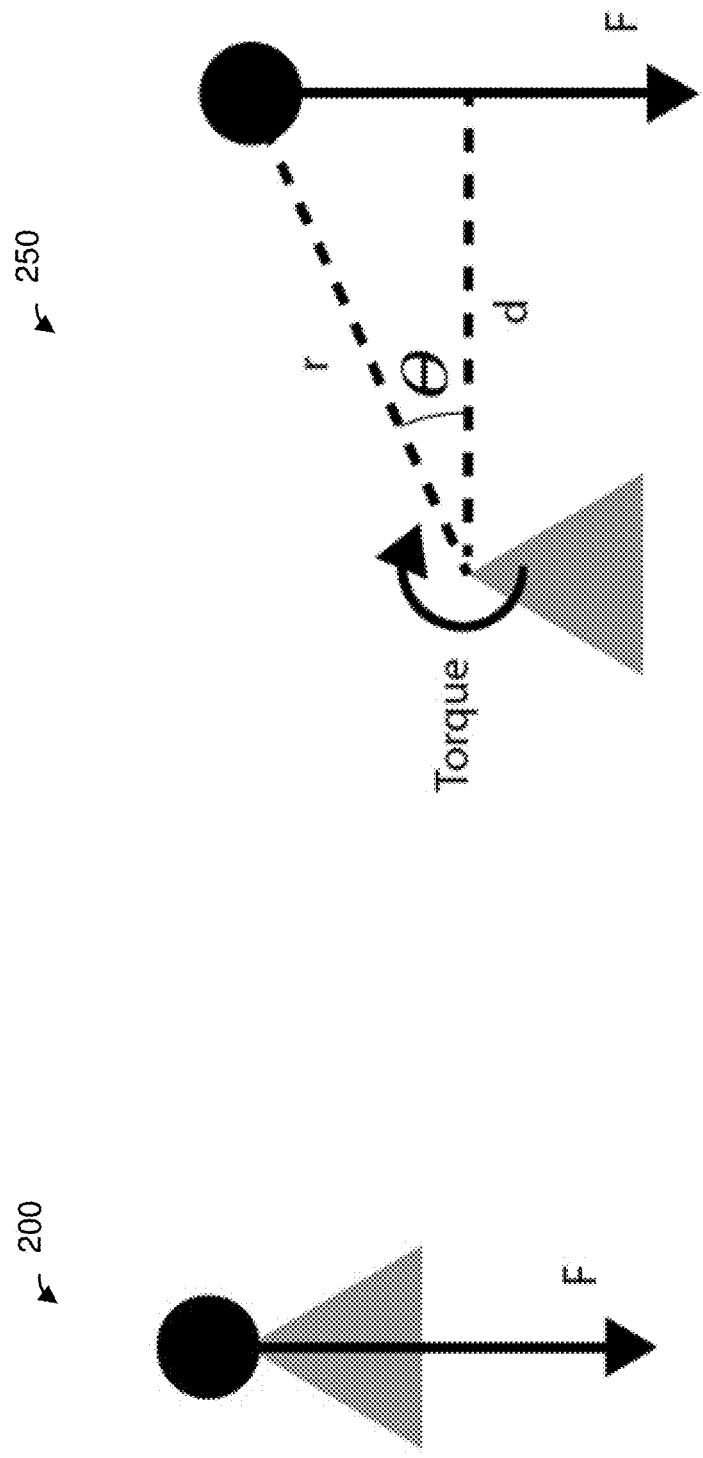

US 10,698,490 B2

HAPTIC FEEDBACK DEVICE, METHOD AND SYSTEM

CROSS-REFERENCE TO RELATED APPLICATIONS

The present application claims the benefit of priority to U.S. Provisional Application No. 62/615,587, entitled "3D Haptic Input Device and Method," which was filed on Jan. 10, 2018, and is incorporated herein by reference in its entirety.

FIELD OF THE DISCLOSURE

The present disclosure generally relates to an input device and method thereof for use with a computing device. More specifically, the present disclosure relates to an input device and method thereof that provides haptic feedback in relation to interactions with an object in a virtual computing environment.

BACKGROUND

When a user reaches out to pick up an object in a virtual and/or augmented environment and does not feel the objection and/or only feels a vibration, the façade of the virtual and/or augmented environment crumbles and the user experience may be reduced.

Controller devices and associated computing devices and software may be used in a variety of systems to provide haptic feedback to a user to help improve virtual and/or augmented environments. Use of a controller device may allow a user to interact with a 3D virtual environment and perceive a sense of touch from objects in the virtual and/or augmented environment. These systems may be used in a variety of fields such as gaming, virtual reality, augment reality, surgery training, industrial design, etc. Accordingly, there is a need for controller devices with haptic feedback that is available to a broad consumer market.

SUMMARY

In an embodiment, a haptic feedback device comprises a body having one or more movable components. The haptic feedback device also comprises a controller configured to move the one or more movable components in response to control signals received from a processor, the control signals generated based on a state of interaction between a user and a virtual environment, to shift a center of gravity of the haptic feedback device so as to impart particular haptic sensations to the user corresponding to the state of interaction between a user and a virtual environment, and dynamically adjust respective positions of one or more of the movable components to dynamically shift the center of gravity of the haptic feedback device based on changes in a physical state of the haptic feedback device as the user physically manipulates the haptic feedback device.

In another embodiment, a method for operating a haptic feedback device having one or more movable components includes: receiving, at a controller of the haptic feedback device from a processor, control signals generated based on a state of interaction between a user and a virtual environment; moving, with the controller based on the signals received from the processor, positions of the one or more movable components to shift a center of gravity of the haptic feedback device so as to impart particular haptic sensations to the user corresponding to the state of interaction between a user and a virtual environment; and dynamically adjusting, with the controller, respective positions of one or more of the movable components to dynamically shift the center of gravity of the haptic feedback device based on changes in a physical state of the haptic feedback device as the user physically manipulates the haptic feedback device.

In still another embodiment, a system includes a processor coupled to a virtual environment device configured to present a virtual environment to a user. The processor is configured generate control signals based on a state of interaction between a user and a virtual environment. The system also includes a haptic feedback device. The haptic feedback device comprises a body having one or more movable components; and a controller configured to move, based on the signals received from the processor, positions of the one or more movable components to shift a center of gravity of the haptic feedback device so as to impart particular haptic sensations to the user corresponding to the state of interaction between a user and a virtual environment, and dynamically adjust respective positions of one or more of the movable components to dynamically shift the center of gravity of the haptic feedback device based on changes in a physical state of the haptic feedback device as the user physically manipulates the haptic feedback device.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIGS. 2A-2C are diagrams illustrating shifting of center of gravity of a haptic feedback device with respect to a point of contact of the user with the haptic feedback device, according to various embodiments and/or scenarios.

DETAILED DESCRIPTION

Figure 1:
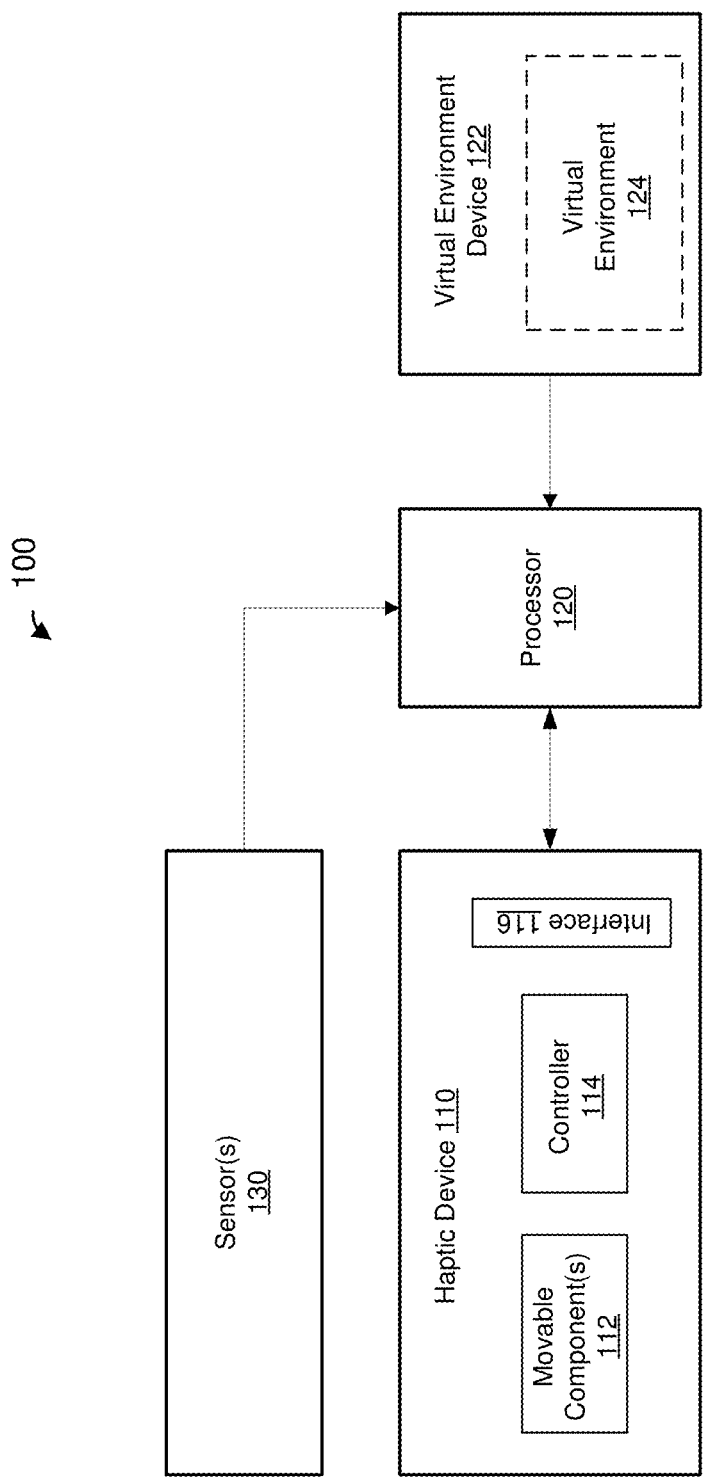
FIG. 1 is a block diagram of a system in which haptic feedback techniques of the present disclosure may be implemented, according to an embodiment.

In embodiments described below, a haptic feedback device may include one or more movable components (e.g., weights) that may be manipulated to simulate a weight and tactility of an object in a non-physical world, such as in a virtual reality (VR) environment, an augmented reality (AR) environment, etc. The haptic feedback device may include a variety of different forms. For example, the haptic feedback device may be designed or shaped to a wide array of items including, but not limited to, a pen, a stylus, a joystick, a controller, a steering wheel, one or more tools (such as, a hammer, a screwdriver, a scalpel, an axe, and/or a saw), and/or weapons (such as a bow and arrow, a sword, a knife, and/or a gun). Additionally, the haptic feedback device may be attached to a body of a user to impart sensations to one or more parts of the body of the user including, but not limited to, one or both hands, one or both the feet, a torso, one or both arms, one or both legs, the head, the neck, one or both shoulders, etc.

In various embodiments, by manipulating respective positions of the one or more movable components of the haptic feedback device, the haptic feedback device's center of gravity, center of mass and/or moment of inertia may change, which may create haptic/tactile sensations for the user of the haptic feedback device. The one or more movable components may include weights attached to the haptic feedback device, a battery used to provide power for the haptic feedback device, a motor used to redistribute the weight of the haptic feedback device, movable part of a chassis of the haptic feedback device (e.g., with one or more other components attached to the movable part of the chassis) and/or any other movable component attached to and/or within the haptic feedback device. Positions of the one or more movable components may be moved/shifted using motors or other suitable means to change the center of gravity, center of mass and/or moment of inertia. Changing the haptic feedback device's center of gravity, center of mass and/or moment of inertia may give different sensations to the user and/or may give the haptic feedback device different physical characteristics as the user moves it through space. For example, when the one or more movable components move farther from an axis of rotation (i.e., a point of contact between the haptic feedback device and the user), a rotational velocity of the haptic feedback device becomes increasingly more difficult to change. Consequently, when the haptic feedback device's center of gravity is placed away from the point of contact between the user and the haptic feedback device, torque may be perceived, and torque may be much more noticeable than when the center of gravity is balanced near the point of contact between the user and the haptic feedback device. This perceptual difference may be taken advantage of to create various sensations, and the difference increases as the center of gravity moves farther from the point of contact, because greater torque is needed to hold up the same amount of weight. The one or more movable components of the haptic feedback device may be strategically placed to apply torque, kinetic energy, angular momentum, and more to the user.

The one or more movable components may simulate interactions with objects in a virtual environment with which a user may be interacting. For example, by shifting and/or moving respective positions of the one or more movable components to strategic places in/on the haptic feedback device, simulated experiences may be felt by a user such as catching objects, picking up objects, touching obstructions, sculpting objects, shaking hands, turning a key, holding a cup, throwing one or more objects, pushing one or more objects, interacting with a virtual environment including one or more virtual structures, wind, water, and/or rain, etc. Further, the one or more movable components may make the haptic feedback device itself feel like different objects in the virtual environment. For example, by shifting and/or moving positions of the one or more movable components to strategic places in/on the haptic feedback device, a feeling of the haptic feedback device by a user may be transformed into different tools, weapons, and/or items such as a hammer, a screwdriver, a scalpel, axe, a bow and arrow, a broadsword, a knife, gun, a steering wheel, and/or a helicopter joystick.

To more realistically simulate various sensations, shapes, etc., in an embodiment, a physical state (e.g., position, orientation, yaw, pitch, roll, acceleration, speed, etc.) of the haptic feedback device may be monitored as the user is operating/handling the haptic feedback device, and positions of one or more of the movable components may be dynamically adjusted based on changing physical state of the haptic feedback device, for example as the user is moving the haptic feedback device in space. For example, respective positions of one or more of the movable components may be dynamically adjusted based on changing physical state of the haptic feedback device so as to maintain substantially constant torque and, accordingly, substantially unchanging sensation imparted on the user as the user is handling the haptic feedback device. In an embodiment, for example, positions of one or more of the movable components may be dynamically adjusted as the angle with which the haptic feedback device is being held or otherwise oriented relative to a reference plane (e.g., the ground) changes, so that the torque applied to the user remains the same as orientation of the haptic feedback device changes. On the other hand, in some scenarios, static movable component positions may be utilized so that the torque applied to the user changes as orientation of the haptic feedback device changes, for example if such changing torque more realistically simulates changing sensations that the user would feel if the user were physically handling the object being simulated by the haptic feedback device. Accordingly, in some embodiments, dynamic adjustment of movable components is performed in some scenarios and not performed in other scenarios depending, for example, on the object or environment that is being simulated by the haptic feedback device. Further, in some embodiments, the one or more movable components of the haptic feedback device may be automatically kept balanced in place when in a "rest mode", by using technology similar to passive camera gimbals, and/or by simply allowing the weight to hang at the lowest point when not being used to simulate a sensation.

Although various haptic feedback devices are generally described herein as having "movable components" that may be manipulated to shift the center of gravity of the haptic feedback devices, shifting the center of gravity may be achieved in any other suitable manners in other embodiments. Generally, there may be a variety of different ways to shift a center of gravity of a haptic feedback device. For example, a weighted disc may be attached off-center and rotated by an electric motor. The haptic feedback device itself and/or parts of the haptic feedback device may shift and/or transform to change an overall center of gravity. Further, the haptic feedback device itself and/or parts of the haptic feedback device, which may be used for other functions, such as one or more sensors, a handle, and/or one or more structural elements, may transformed and/or manipulated to alter the center of mass, center of gravity and/or moment of inertia of the haptic feedback device. A magnetic field could propel a magnet along a track. A liquid may be pushed through valves and/or sacks, which may be similar to peristalsis. Further, one or more movable components may be moved along a track (e.g., a motor that propels itself along the track), worm gear, rotated on an arm controlled by a motor, and/or pulled by a pulley system.

Shifting the center of gravity of the haptic feedback device may create desired sensations for a user without requiring the haptic feedback device to be fixed or stationary, but instead by leveraging the downward acceleration created by the mass of the earth. Consequently, the user may be able to pick up the haptic feedback device and to immediately begin feeling sensations curated by strategically shifting center of gravity of the haptic feedback device. The user may further be able to move anywhere through space while continuing to feel the desired sensations, and the center of gravity of the haptic feedback device may continue being manipulated to maintain the sensations and/or to curate other sensations. In some embodiments, such manipulation of the center of gravity may be controlled in a fully wireless manner, enabling the user to be completely untethered to any particular physical space.

In some embodiments, the haptic feedback device may be provided as a hardware add-on device to an existing platform, such as a smartphone, an AR/VR device (e.g., a glove, a headset), etc. Such an add-on haptic feedback device may be manufactured, adapted, or 3D printed to fit the specific platform. As an example, the haptic feedback device may be provided as a smartphone attachment (e.g., similar to an external battery case), which may connect via a suitable interface (e.g., a wired interface, a Bluetooth interface, etc.) to the smartphone. Applications within the smartphone may be installed and utilized to calculate how one or more movable components in the haptic feedback add-on device should be manipulated based on user's interaction with the application. In some embodiments, the smartphone's physical state (e.g., angle at which the smartphone is held or otherwise oriented with respect to a reference plane) may be monitored and the smartphone's physical state may be taken into account when positions of the one or more movable components are calculated and/or adjusted. The application may utilize the smartphone's processing power, sensor information, battery power, etc. When the one or more movable components are moved to shift a center of gravity of the smartphone with the attached haptic feedback device, the user may feel as if the smartphone is pulling or twisting in various ways, which may be used for simulating AR/VR experiences, games, etc., for example.

As another example, the haptic feedback device may be provided as an add-on to an AR/VR hardware device such as a controller, a glove, a headset, etc. Shifting of the center of gravity of the haptic feedback add-on device may be utilized to create sensations in an AR/VR headset, for example, to make it feel as if the user's head is being tugged in a particular direction. This may make it feel as if something in the virtual environment is pressing on the user, or may be used to signal different cues to the user. As just an example, shifting of the center of gravity of a headset with the added-on haptic feedback device may impart a sensation of a tug to the right on the headset, which may inform the user that the user should turn and look to the right.

In some embodiments, wireless charging may be used to reduce or minimize the overall weight of the haptic feedback device. For example, by remotely providing a supply of power to the haptic feedback device, the size of the battery needed to operate sensors and/or any means (e.g., motors) of manipulation of the center of gravity of the haptic feedback device may be significantly reduced. Consequently, stronger motors may be powered to manipulate the haptic feedback device's center of gravity without increasing the device's overall weight due to higher battery capacity needs, in some embodiments.

FIG. 1 is a block diagram of a system 100 in which haptic feedback techniques of the present disclosure may be utilized, according to an embodiment. The system 100 may include a haptic feedback device 110 which may, in turn, include one or more movable components 112, a controller 114 and an interface 116. The interface 116 may be any suitable wireless or wired interface that may allow the haptic feedback device 110 to communicatively couple to a processor 120 and/or a virtual environment device 122 in any suitable wired or wireless manner. The processor 120 may be a processing unit implemented using hardware (e.g., one or more integrated circuits, an application-specific integrated circuit (ASIC), a programmable logic device (PLD), etc.), implemented as a processor executing firmware instructions stored in a memory, implemented as a processor executing software instructions stored in a memory, or any combination thereof. Although the processor 120 is illustrated in FIG. 1 as being separate from the haptic feedback device 110 and the virtual environment device 122, the processor 120 may instead be at least partially included in the haptic feedback device 110 and/or the virtual environment device 122, in some embodiments. In embodiments in which the processor 120 is a part of the haptic feedback device 110 and/or the virtual environment device 122, the haptic feedback device 110 may couple via the interface 116 directly to the virtual environment device 122.

The virtual environment device 122 may implement/simulate a virtual environment 124. A user may interact with the virtual environment 124 using the haptic feedback device 110. The virtual environment device 122 may be a headset device (e.g., a VR headset), goggles or glasses (e.g., smart glasses, AR glasses, etc.), a computing device, a smartphone, a television, a projection screen, or any other suitable device that may be used to present non-physical (e.g., virtual, augmented or remote) reality to a user. The virtual environment device 122 may include a processor, which may be implemented using hardware (e.g., one or more integrated circuits, an ASIC, a PLD), as a processor executing firmware instructions stored in a memory, as a processor executing software instructions stored in a memory, or any combination thereof. In some embodiments, in addition to performing operations associated with presenting a non-physical environment to a user, the processor of the virtual environment device 122 may also be configured/utilized to perform various operations for controlling operation of the haptic feedback device 110, such as performing calculations and generating signals for shifting a center of gravity of the haptic feedback device 110. For example, at least some operations generally described herein with respect to the processor 120 may instead be performed by the processor of the virtual environment device 122, in some embodiments. In some embodiments, the processor of the virtual environment device 122 may directly control haptic feedback operation of the haptic feedback device 110, for example to directly cause shifting of a center of gravity of the haptic feedback device 110.

The virtual environment 124 may be any environment in which the user is not physically present and thus with which the user cannot physically interact. For example, the virtual environment 124 may be a virtual reality presented to the user via a VR device, an augmented reality presented to the user via an AR device, a two dimensional computer generated virtual environment presented to the user via a computer, a smartphone, a television, a projection screen, etc., or may be any remote physical environment/space in which the user is not physically present and with which the user may be unable to physically interact.

The virtual environment device 122 may be coupled to the processor 120 and may provide virtual state signals to the processor 120. The virtual state signals provided by the virtual environment device 122 to the processor 120 may be indicative of a state of interaction of the user with the virtual environment 124. In various embodiments, a state of interaction between the user and the virtual environment 124 at any given time may be defined by actions performed by the user in the virtual environment 124, forces or sensations incurrent or experienced by the user in the virtual environment 124 and/or any other interactive experiences of the user with the virtual environment 124. For example, a virtual state signal provided by the virtual environment device 122 to the processor 120 may indicate that the user has performed, or is in the process of performing, a particular action, such as catching an object, picking up an object, touching an obstruction, pressing on an object, increasing or decreasing a force, shaking hands, turning a key, holding a cup, throwing one or more objects, pushing one or more objects, interacting with the environment including one or more virtual structures, wind, water, and/or rain, etc. in the virtual environment 124. In response to receiving the virtual state signal, the processor 120 may determine how the movable components 112 of the haptic feedback device 110 should be manipulated in order to simulate a sensation that corresponds with the action performed by the user in the virtual environment 124. For example, in a scenario in which the user picks up a virtual object in the virtual environment 124, the processor 120 may determine new positions of one or more of the movable components 112 in the haptic feedback device 110 so that the center of gravity of the haptic feedback device 110 shifts away from the point of contact of the user with the haptic feedback device 110 thereby creating a sensation that the haptic feedback device 110 becomes heavier. On the other hand, in a scenario in which the user drops a virtual object in the virtual environment 124, the processor 120 may determine new positions of one or more of the movable components 112 in the haptic feedback device 110 so that the center of gravity of the haptic feedback device 110 shifts closer to the point of contact of the user with the haptic feedback device 110 thereby creating a sensation that the haptic feedback device 110 becomes lighter. In some embodiments, algorithms used to calculate how the one or more movable components should be manipulated to create various sensations may be fine-tuned during testing/operation of the haptic feedback device 110 to make the sensation more realistic.

The processor 120 may be configured to generate control signals based on results of the calculations, and to provide the control signals to the haptic feedback device 110. The controller 114 of the haptic feedback device 110 may control the means (e.g., one or more motors) for moving the one or more movable components 112 based on the control signals to move the movable components 112 to the positions calculated by the processor 120. For example, the controller 114 may convert the control signals to signals suitable for driving motors used to move the movable components 112 to the positions calculated by the processor 120.

To perform the calculations, the processor 120 may keep track of the current center of gravity of the haptic feedback device 110, and the relation of the center of gravity to the user's point of contact with the haptic feedback device 110. The point of contact may be predetermined and stationary, such as when a handle is provided for holding/handing the haptic feedback device 110, or the point of contact may be detectable via a sensor. To keep track of the center of gravity of the haptic feedback device 110, the processor 120 may track the movable components 112 used to manipulate the center of gravity of the haptic feedback device 110. For example, if a motor is used to move the movable components 112, the processor 120 may monitor the motor's rotational position to keep track of where the movable components are positioned. With certain motors, such as servo, dc, or stepper motors, the processor 120 may track positions of the movable components 112 by counting the number of steps the motor moves or by measuring the degree of rotation occurring as the motor operates. At any given time throughout operation of the haptic feedback device 110, the processor 120 may calculate the current center of gravity of the haptic feedback device 110 based on the current positions of the movable components 112, the weighs of the movable components 112, and the center of gravity of the haptic feedback device 110 without the movable components 112.

Alternatively, the center of gravity of the haptic feedback device may be measured directly using various devices such as strain gauges. For example, a strain gauge between the user's point of contact with the device (e.g., a handle), and the movable components 112 may measure the overall forces felt by the user.

The processor 120 may additionally monitor a physical state (e.g., position, yaw, pitch, roll, acceleration, speed, etc.) of the haptic feedback device 110, for example as the user is moving the haptic feedback device 110 in space, and to dynamically calculate adjustments to the center of gravity of the haptic feedback device 110 for example in order to maintain the desired effect imparted on the user with the changing position, yaw, pitch, roll, acceleration, speed, etc. of the haptic feedback device 110. To monitor the physical state of the haptic feedback device 110, one or more sensors 130 may be utilized. The one or more sensors 130 may include, for example, one or more of an accelerometer, a gyroscope, a magnetometer, a nine degree of freedom (9 DOF) sensor, etc. The one or more sensors 130 may be located externally to the haptic feedback device 110 (as shown) or may be included in the haptic feedback device 110. The one or more sensors 130 may continually or periodically collect physical state data such as yaw, pitch, roll, acceleration, speed, and location in 3D space, etc., and the physical state sensor data may be provided to the processor 120. The one or more sensors 130 may utilize any suitable sensing techniques which include, but are not limited to, magnetic tracking, inertial tracking, optical tracking (with or without visible markers), depth map tracking, or any techniques that have not been invented as of the time of this disclosure.

In some embodiments, whether or not adjustments of the center of gravity of the haptic feedback device 110 based on physical state of the haptic feedback device 110 are performed (e.g., whether the dynamic adjustments are enabled or disabled) may depend on the particular environment or object being simulated by the haptic feedback device 110. For example, in some embodiments and/or scenarios, the haptic feedback device 110 may be used to simulate a static object such as a stylus, a weapon, a tool such as an axe or a hammer, etc., the perceived weight of which would in reality remain substantially the same as the object moves in space. In such embodiments and/or scenarios, after initially shifting the center of gravity of the haptic feedback device 110 to simulate the weight and feel of the static object, dynamic adjustments to the center of gravity of the haptic feedback device 110 based on the physical state of the haptic feedback device 110 are not performed. For example, dynamic adjustment of the center of gravity of the haptic feedback device may be disabled. Accordingly, in such scenarios, as the user changes the physical state of the haptic feedback device 110, e.g., changes the angle at which the haptic feedback device 110 is oriented with respect to a reference plane (e.g., the ground), the center of gravity of the haptic feedback device 110 moves correspondingly to realistically simulate the feel of the static object.

On the other hand, in other embodiments and/or scenarios, the haptic feedback device 110 may be used to simulate a dynamic force or sensation, or a dynamic object that would in reality change its characteristics as the object is moved in space. In such scenarios, dynamic adjustment of the center of gravity of the haptic feedback device 110 may be enabled. For example, in a scenario in which the haptic feedback device 110 is used to simulate twisting of a doorknob in the virtual environment 124, the torque sensation imparted on the user would in reality be independent of the orientation of the haptic feedback device 110. In this scenario, when the user begins to twist the virtual door knob, the processor 120 may initially cause the center of gravity of the haptic feedback device 110 to shift away from the user's point of contact with the haptic feedback device 110, in order to impart the desired torque on the user. The processor 120 may then cause the center of gravity of the haptic feedback device 110 to be dynamically adjusted based on the physical state of the haptic feedback device 110, for example as the user changes orientation of the haptic feedback device 110 with respect to a reference plane (e.g., the ground), so as to maintain a constant torque imparted on the user at the user's point of contact with the haptic feedback device 110. As another example, in a scenario in which the haptic feedback device 110 is used to simulate picking up of a virtual object in the virtual environment, the processor 120 may initially cause the center of gravity of the haptic feedback device 110 to shift away from the point of contact. The processor 120 may then cause dynamic adjustments to the center of gravity of the haptic feedback device 110 as the user changes orientation of the haptic feedback device 110 to maintain a same constant torque on the user's point of contact so as to maintain a constant simulated weight of the virtual object.

In some embodiments, the processor 120 may cause dynamic adjustments to the center of gravity of the haptic feedback device 110 in relation to the user's point of contact with the haptic feedback device 110, based on a state of interaction between a user and the virtual environment 124, such as based on a changing simulated force, sensation or object characteristics as the user continues to interact with the virtual environment. As an example, in the scenario in which a virtual doorknob is being simulated, the desired torque imparted on the user may increase as the degree to which the virtual doorknob is rotated increases, because the doorknob in reality would become progressively more difficult to turn the further it is turned. Thus, as the user is twisting the virtual doorknob in the virtual environment, the processor 120 may cause the center of gravity of the haptic feedback device 110 to be dynamically shifted further away from the user's point of contact with the haptic feedback device 110, based on the changing degree to which the virtual doorknob is rotated in the virtual environment 124, in order to increase the torque imparted on the user as the degree of rotation increases. On the other hand, in response to the user releasing the virtual doorknob in the virtual environment 124, the processor 120 may cause the center of gravity of the haptic feedback device 110 to quickly drop below the user's point of contact. This may quickly eliminate the torque sensation imparted on the user, and would be faster (and thus more convincing) in some cases than slowly moving the center of gravity closer to the user's point of contact.

Figure 2C:
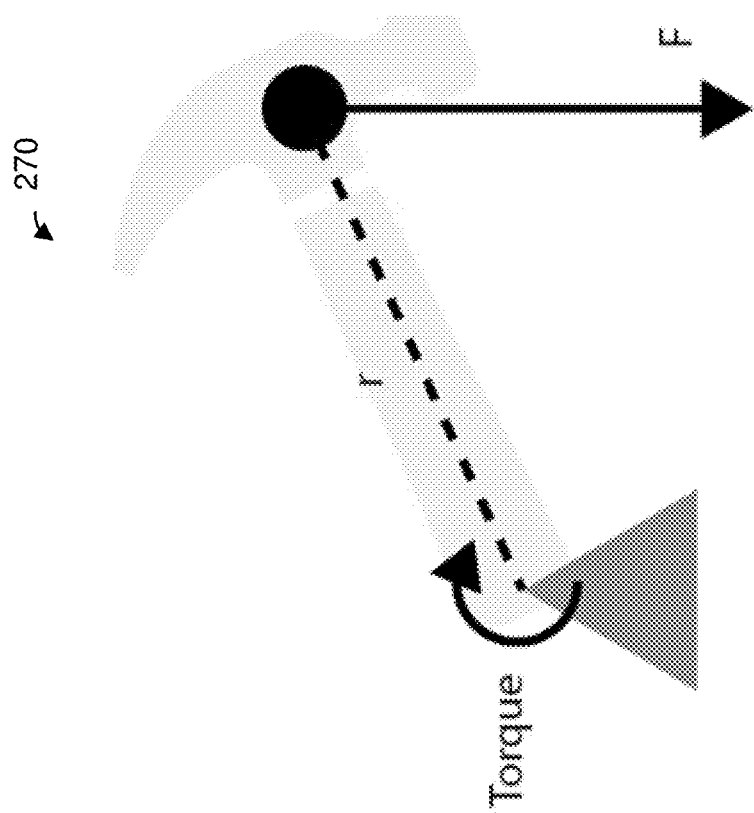

Referring briefly to FIGS. 2A-2C, scenarios 200, 250 and 270 illustrate various calculations that may be performed by the processor 120 to determine how to shift the center of gravity of the haptic feedback device 110, according to embodiments. Turning first to FIG. 2A, in a scenario 200, the center of gravity of the haptic feedback device 110 is centered over the user's point of contact (e.g., a handle). In this scenario, the force of gravity applied to the haptic feedback device 110 is directed straight down through the user's point of contact with the haptic feedback device 110, and thus the force of gravity is not very noticeable to the user. Referring now to FIG. 2B, in the scenario 250, the center of gravity of the haptic feedback device 110 is shifted away from the user's point of contact. The force of gravity applied to the haptic feedback device 110 is in this case directed downwards at a point away from to the user's point of contact, thereby producing a torque at the user's point of contact. The processor 120 may calculate the resultant torque imparted on the user based on i) a distance r of the center of gravity from the point of contact and ii) the angle $\theta$ with respect to a reference plane (e.g., the ground) that the center of gravity is located in relation to the user's point of contact. Further, the effective lever arm distance d may be calculated based on the distance r and the angle $\theta$. The angle $\theta$ may change based on the manipulation of the center of gravity of the haptic feedback device 110 or based on the angle at which the haptic feedback device 110 is oriented with respect to a reference plane (e.g., the ground). Accordingly, if desired, the processor 120 may calculate adjustments to positions of one or more movable components of the haptic feedback device 110 in order to maintain a desired torque on the user's point of contact with the haptic feedback device 110 based on the physical state of the haptic feedback device 110, for example as the user is changing the angle at which the haptic feedback device 110 is oriented with respect to a reference plane (e.g., the ground). For example, as the angle $\theta$ increases, the torque felt by the user will decrease because the lever arm distance d will decrease. To maintain a consistent sensation of torque, processor 120 may cause one or more movable components to move in relation to the user's point of contact to ensure that the angle $\theta$ stays the same. Alternatively, the resultant torque may be adjusted or maintained by changing the distance r to compensate for a change in the angle $\theta$.

Turning now to FIG. 2C, in the scenario 270, to simulate something static, like a virtual hammer, the center of gravity does not need to be dynamically adjusted based on the physical state of the haptic feedback device 110, such as based on the angle at which the haptic feedback device 110 is oriented with respect to a reference plane (e.g., the ground), because although the resultant torque may change as the user moves the device in space, the same would happen with a hammer in real life. Thus, not performing adjustment of the center of gravity of the haptic feedback device 110 with the changing angle θ may result in an accurate representation of the forces of a virtual hammer, in an embodiment.

Referring again to FIG. 1, in some embodiments, the processor 120 may be configured to map virtual forces to a range of weight sensations that the haptic feedback device 110 is capable of producing. Generally speaking, in at least some embodiments, the goal of the simulation may not be to exactly mirror the virtual experience of the user in the virtual environment 124, but rather to create an approximation of the virtual experience of the user in the virtual environment 124. For example, in an embodiment in which a crane operator is remotely operating a crane, the processor 110 may map the range of weights within the operating capacity of the actual crane to the range of weight sensations the haptic feedback device 110 is capable of producing. As a more specific example, if i) the operating capacity of the crane is between 0-10,000 pounds, ii) the crane is currently lifting 5,000 pounds and iii) the weight sensations that the haptic feedback device 110 is capable of producing is between 0 and 16 ounces, the processor 120 may place the movable components 112 such that the device the haptic feedback device 110 produces a sensation of 8 ounces. When the user feels the full 16 ounce force simulation from the haptic feedback device 110, the user may gain a greater intuitive understanding that the crane is operating near its failure threshold. In an embodiment, as the user approaches the full 16 ounces of force simulation from the haptic feedback device 110, the processor 120 may cause the haptic feedback device 110 to provide further cues that the crane is operating near the crane's operating limit. For example, the processor 120 may cause one or more of the movable components 112 to vibrate or move back and forth in an erratic manner. A motor manipulating the center of gravity of the haptic feedback device 110 may be capable of pulsing one or more of the movable components 112 in order to create a sensation similar to vibration. Alternatively or additionally, a separate vibration component (e.g., a motor) may be included in the haptic feedback device 110, and the processor 120 may control the separate vibration component in order to create a sensation of vibration for the user.

Figure 3:
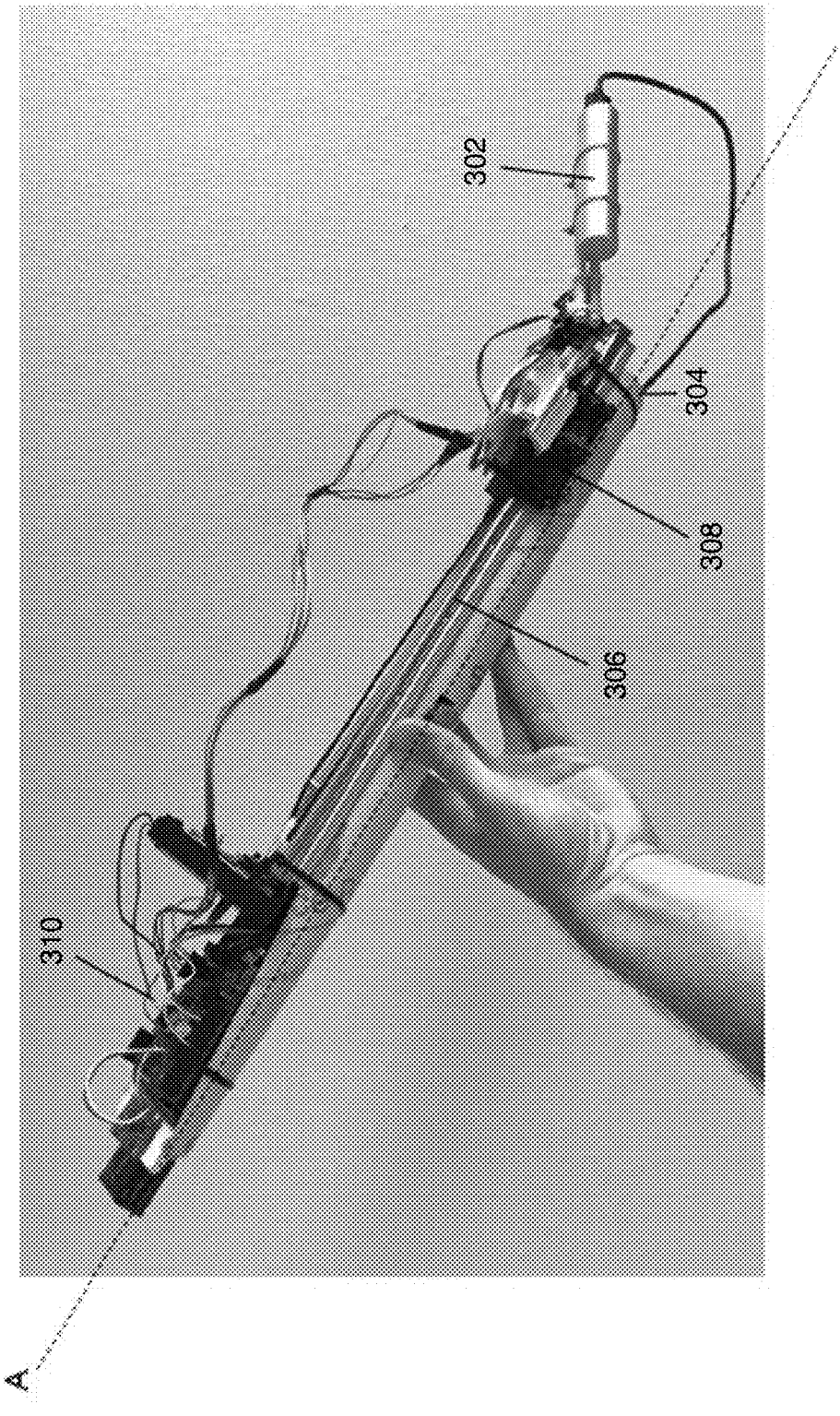
FIG. 3 is a diagram of a haptic feedback device of the present disclosure, according to an embodiment.

FIG. 3 is a diagram of a haptic feedback device 300, according an embodiment. The haptic feedback device 300 includes a movable component (e.g., weight) 302 that may move linearly in order to change the haptic feedback device's center of gravity or moment of inertia along a single axis A. When the weight 302 is moved forward, for example, the haptic feedback device 300 may feel like a weight is hanging off a tip 304 of the haptic feedback device 300. Alternatively and/or additionally, the haptic feedback device 300 may feel like a user has "picked up" a virtual object. In order to ensure that the sensation does not change when the haptic feedback device 300 is oriented vertically (i.e., when the moment of inertia would be the same whether the weight is extended or retracted), the weight 302 of the haptic feedback device 300 may be maintained level to the ground.

As shown in FIG. 3, the weight 302 may be extended along a printer track 306, using a stepper motor 108. While the haptic feedback device 300 of FIG. 3 uses a printer track, other mechanisms may be used to extend and/or move the weight 302, such as a worm gear and/or a specialized track. In order to maintain the weight's 302 level, a controller may be used, such as a 9 DOF sensor 310. The 9 DOF sensor 310 may include an accelerometer, a gyroscope, and a magnetometer, which may constantly monitor the haptic feedback device's 300 yaw, pitch, roll, acceleration, speed, and location in 3d space. Data of the 9 DOF sensor 310 may be provided to motors, such as servo motors, which correspondingly may react to the haptic feedback device's 300 movements and adjust position of the weight 102, for example to keep the weight 102 level with respect to a reference plane, such as the ground. Data of the 9 DOF sensor 310 may include, for example, accelerometer data, gyroscope data, magnetometer data, haptic feedback device's 300 movement, and/or a location in space of the haptic feedback device 300. Many different types of sensors may be used to track the location of the haptic feedback device 300, including, but not limited to, optical systems, electromagnetic fields, acoustics, lasers, and mechanical systems.

Two servo motors may manipulate a position of the weight 302 in a three dimensional manner. When the weight 302 is twisted to a side, torque may be applied to a handle, which may simulate objects in a virtual environment turning, such as screwing a screwdriver, turning a steering wheel, holding a cup, etc. Using all three motors (stepper motor 308 and two servo motors) in conjunction may create numerous effects as needed by objects in the virtual environment and/or the application of haptic feedback device 300.

Figure 4:
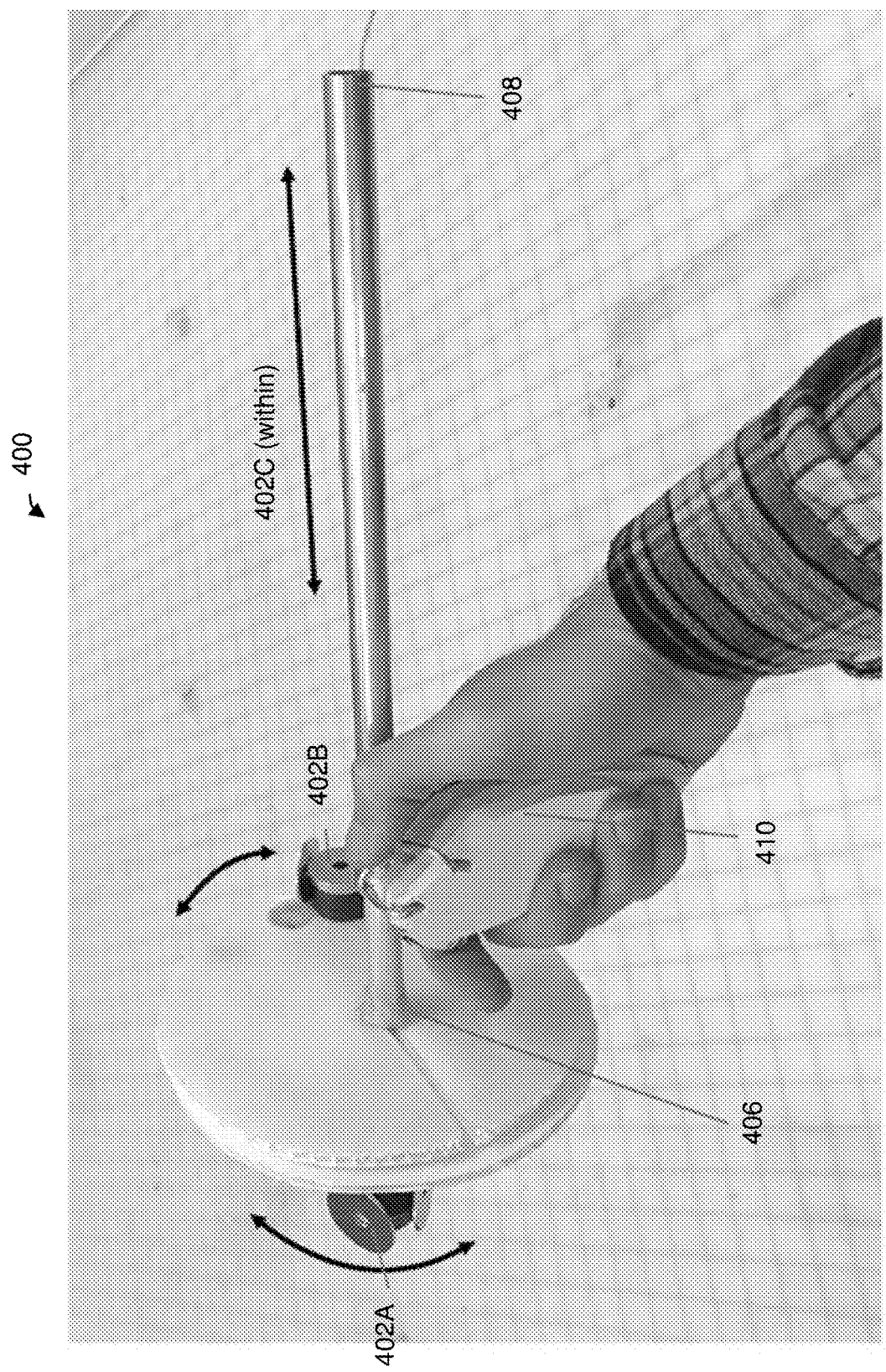
FIG. 4 is a diagram of a haptic feedback device of the present disclosure, according to another embodiment.

In another embodiment, three movable components (e.g., weights) may be attached to and/or contained within the haptic feedback device. As shown in FIG. 4, a haptic feedback device 400 includes movable components (e.g., weights) 402A, 402B, and 402C. Weights 402A and 402B may move within a torus 404 near a tip 406 of the haptic feedback device 400. Weights 402A and 402B may be operated independently. Weights 402A and 402B may be moved by using one or more of stepper motors, servo motors, and/or DC motors. While a center of gravity and/or moment of inertia of the haptic feedback device 400 shifts, an equal and opposite reaction may be created and imparted to the user (in this case torque), which may be used to create desired sensations.

Weights 402A and 402B may be counter-rotated to cancel a torque caused by their rotation. Alternatively, and/or additionally, the torque may be used by moving the weights 402A and 402B in a same direction to create haptic/tactile sensations for a user. In a resting state, the weights 402A and 402B may be balanced at opposite sides of the torus 404. The weights 402A and 402B may be moved at any point along the torus 404 to apply varying degrees of torque to the haptic feedback device 400, which may be maximized when weights 402A and 402B are both at one side parallel to the ground.

Weight 402C may also move independently from weights 402A and 402B. Weight 402C may be moved by using one or more of stepper motors, servo motors, and/or DC motors. Weight 402C may move along a longitudinal axis of the haptic feedback device 400, and weight 402C may move toward the tip 406 of the haptic feedback device 400 to create a sensation of weight hanging off the tip 406 of the haptic feedback device 400. Additionally, and/or alternatively, weight 402C may move towards a back end 408 of the haptic feedback device 400 to create a backwards tilt, which may create a sensation similar to pressing down on a virtual object with the haptic feedback device 400. A solenoid may be used as weight 402C. When the solenoid, acting as weight 402C, is triggered, the solenoid may create a strong vibration along the longitudinal axis, which may simulate firing a gun in a virtual computing environment. Further, one or more of weights 402A, 402B, and 402C may be "jerked"

and/or vibrated, using, for example, any type of motor, to create a sensation of touching an object in a virtual computing environment.

When weights 402A, 402B, and 402C are used in conjunction, weights 402A, 402B, and 402C may move a center of gravity of the haptic feedback device 400 in 360 degrees and/or anywhere in a 3D space around a user's point of contact with the haptic feedback device 400.

The haptic feedback device 400 may also include a handle 410, which may provide one or more of controls, a joystick, a trigger, and/or buttons. Further, handle 410 may be removable and may be configured with different ergonomics. Thus, haptic feedback device 400 may be used as a stylus, which may be for applications requiring more accuracy, and/or as a controller, which may be for applications including gaming, operating machinery, etc. Further, a stylus may also include one or more buttons and/or one or more sensors to be directly manipulated by the user.

Figure 5:
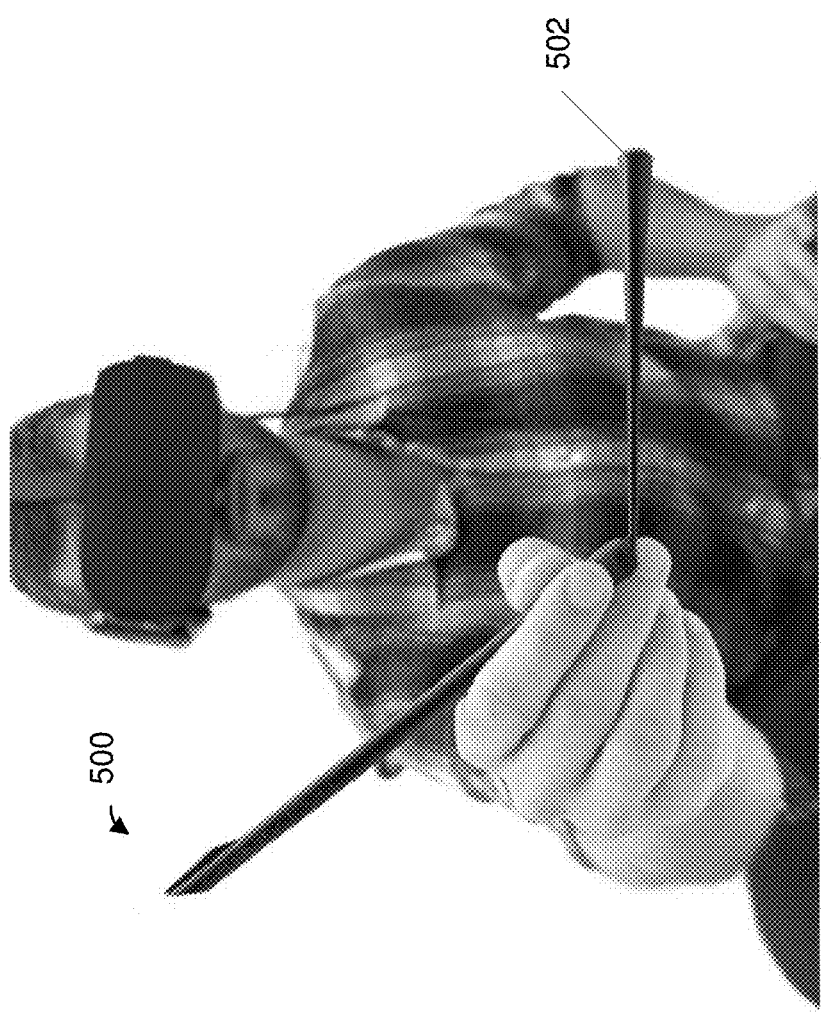
FIG. 5 depicts a stylus embodiment of a haptic feedback device, according to an embodiment.
Figure 6:
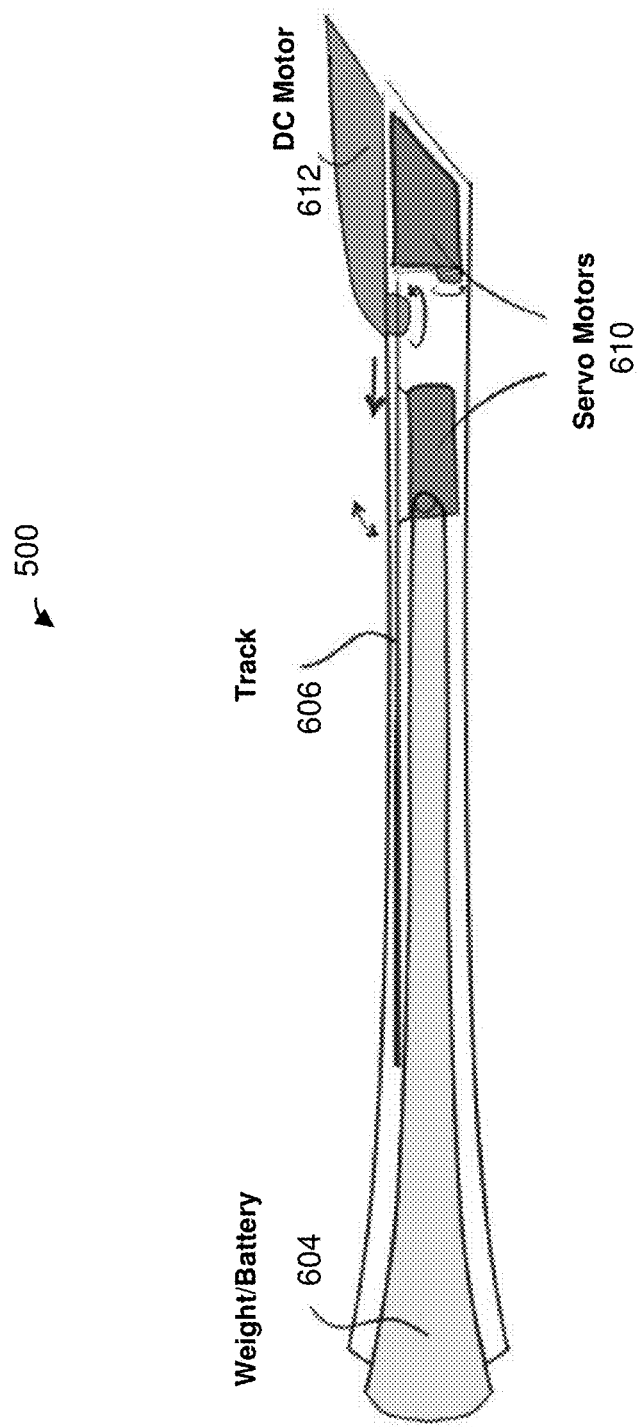
FIG. 6 depicts the haptic feedback device of FIG. 5 in more detail, according to an embodiment.

FIG. 5 depicts a stylus embodiment of a haptic feedback device 500, according to an embodiment. The haptic feedback device 500 includes an extension portion 502. The extension portion 502 may be extended or retracted along a track as needed to shift the center of gravity of the haptic feedback device 500 to impart desired sensations to the user of the haptic feedback device 500. FIG. 6 depicts the haptic feedback device 500 in more detail, according to an embodiment. In the embodiment illustrated in FIG. 6, the haptic feedback device 500 includes an extension portion 604 which, for example, may be a battery used to provide power to the haptic feedback device 500 or may be another suitable component of the haptic feedback device 500. The extension portion 604 may be movable along a track 608 by a motor 610 which may be a step motor, for example. Two servo motors may manipulate a position of the extension component 600 in a three dimensional manner. The position of the extension portion 602 itself may be kept parallel to a reference plane, such as the ground, as the user handles/operates the haptic feedback device 500, in an embodiment.

Figure 7:
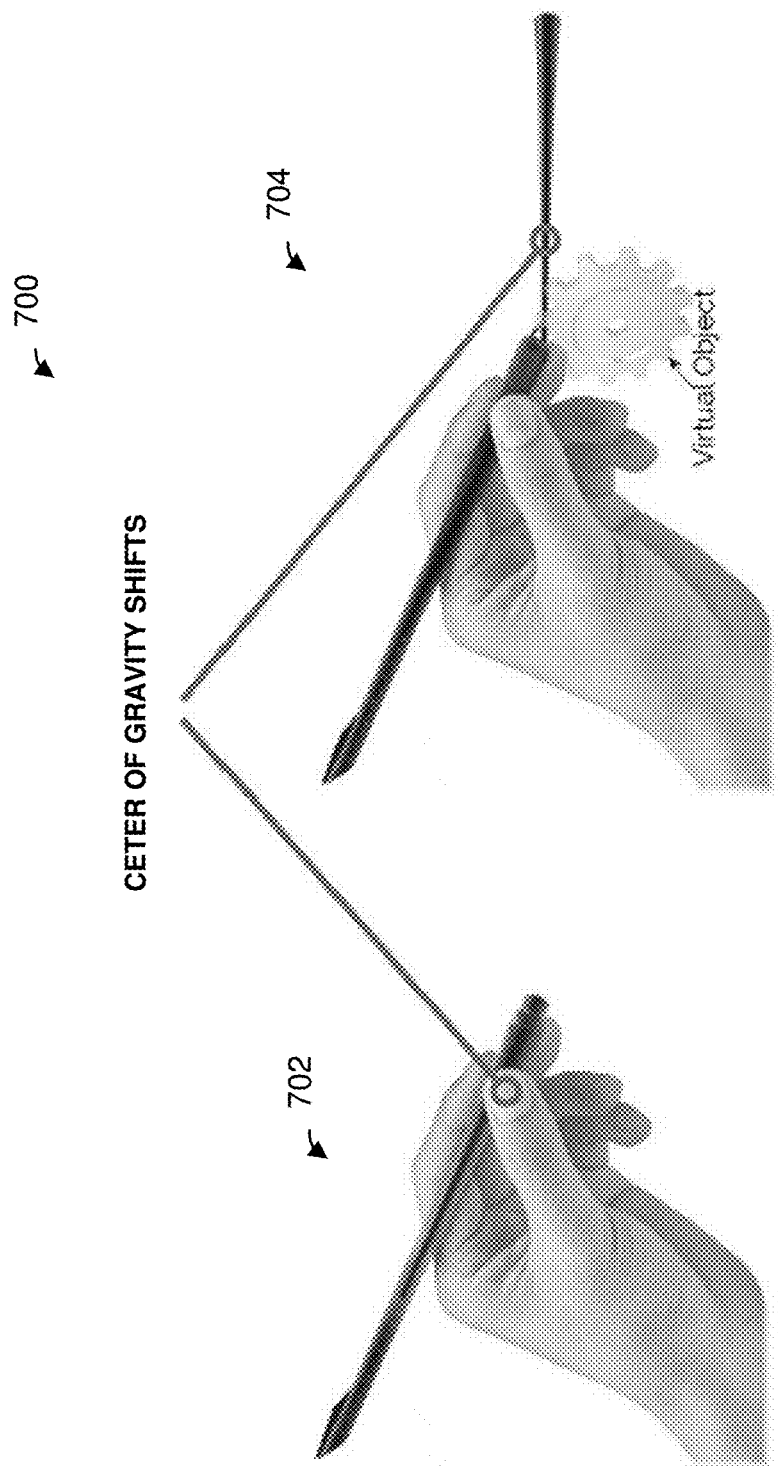
FIG. 7 depicts shifting of a center of gravity of a haptic feedback device, according to an embodiment.

FIG. 7 depicts shifting of a center of gravity of a haptic feedback device 700, according to an embodiment. The haptic feedback device 700 may be generally the same as or similar to the haptic feedback device 500 of FIG. 5. In a scenario 702, an extension component of the haptic feedback device 700 may be retracted, placing the center of gravity of the haptic feedback device 700 at or near user's point of contact with the haptic feedback device 700. In a scenario 704, the extension component of the haptic feedback device 700 is extended, thereby shifting the center of gravity of the haptic feedback device 700 away from the user's point of contact in a manner that may simulate, for example, a virtual object hanging off of the end of the haptic feedback device 700. In an embodiment, the position of the extension component of the haptic feedback device 700 may be dynamically adjusted as described above based on the physical state of the haptic feedback device 700 as the user handles/operates the haptic feedback device 700. For example, the position of the extension component of the haptic feedback device 700 may be dynamically adjusted to keep the extension component of the 3D at least substantially parallel to the ground as the user moves the haptic feedback device 700 in space.

Figure 8:
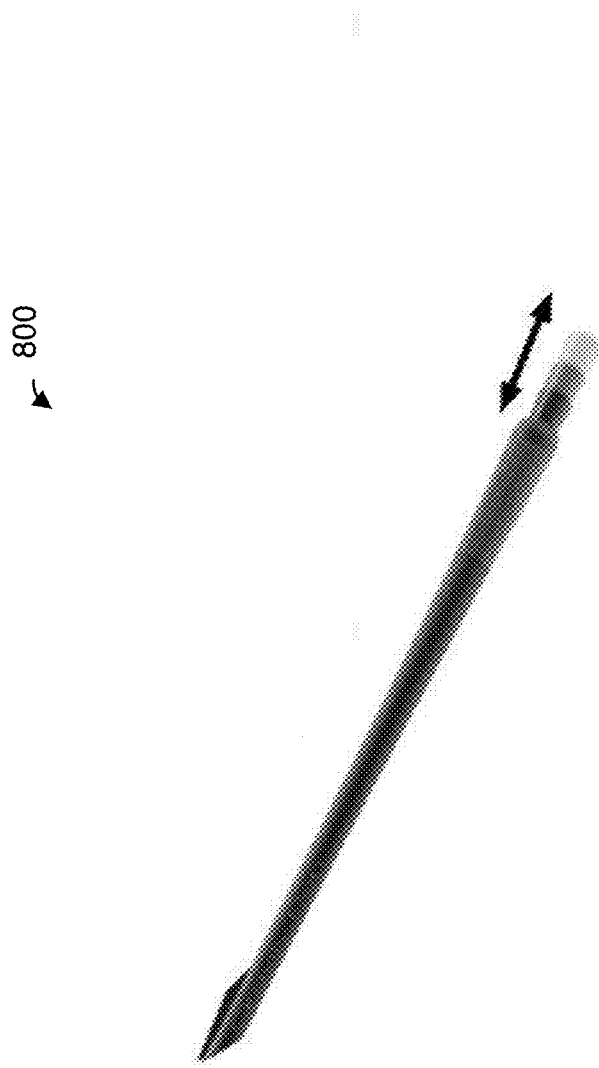
FIG. 8 depicts an example haptic feedback device with vibration and/or jerking capabilities, according to an embodiment.

FIG. 8 depicts an example haptic feedback device 800 with vibration and/or jerking capabilities, according to an embodiment. The haptic feedback device 800 may be generally the same as or similar to the haptic feedback device 500 of FIG. 5. The haptic feedback device 800 may include a means for creating vibrations and/or jerking movements to simulate a jerking movement of a firing gun, for example, or to provide a cue to a user. For example, one or more of the movable components of the haptic feedback device 800 may be capable of creating vibrating and/or jerking sensations by moving back and forth in an erratic manner. A motor manipulating the center of gravity of the haptic feedback device 800 may be capable of pulsing one or more of the movable components of the haptic feedback device 800 in order to create a sensation of vibration or jerking. Alternatively or additionally, a separate vibration component (e.g., motor) may be included in the haptic feedback device 800, and the separate vibration component may be controlled to create vibrating and/or jerking sensations for the user.

Figure 9:
FIG. 9 depicts a haptic feedback device with a handle, according to an embodiment.

FIG. 9 depicts a haptic feedback device 900 with a handle, according to an embodiment. The haptic feedback device 900 may be the same as or similar to the haptic feedback device 400 of FIG. 4 and may include one or more movable components (e.g., weights) the same as or similar to those discussed above with respect to FIG. 4. The haptic feedback device 900 may include a handle 902 which a user may use to hold and operate the haptic feedback device 900 as the user is interacting with a virtual environment. The handle 902 may, therefore, define the point of contact of the user with the haptic feedback device 900. The position of the handle 902 on the haptic feedback device 900 may be used as a point of contact reference in calculations for manipulation of the center of gravity of the haptic feedback device 900. In some embodiments, the handle may include additional control elements (e.g., buttons). In some embodiments, the handle 902 may be removable. For example, the handle may be removed when the haptic feedback device 900 is used as a device requiring more precision and/or dexterity.

Figure 10:
FIG. 10 depicts a haptic feedback device being used as a stylus, a pen, and/or as a device requiring precision and/or dexterity, according to an embodiment.

FIG. 10 depicts a haptic feedback device 1000 being used as a stylus, a pen, and/or as a device requiring precision and/or dexterity, according to an embodiment. The haptic feedback device 1000 corresponds to the haptic feedback device 900 of FIG. 9 with the handle 902 removed, according to an embodiment. When a handle is not present, a predetermined point of contact reference may be assumed in calculations for manipulation of the center of gravity of the haptic feedback device 1000. For example, depending on the particular environment or object that the haptic feedback device 1000 is being used to simulate, a point of contact along a longitudinal axis of the haptic feedback device 1000 or along a torus at the tip of the haptic feedback device 1000 may be assumed. Alternatively, a sensor may be used to detect actual point of contact along any surface of the haptic feedback device 1000.

Figure 11:
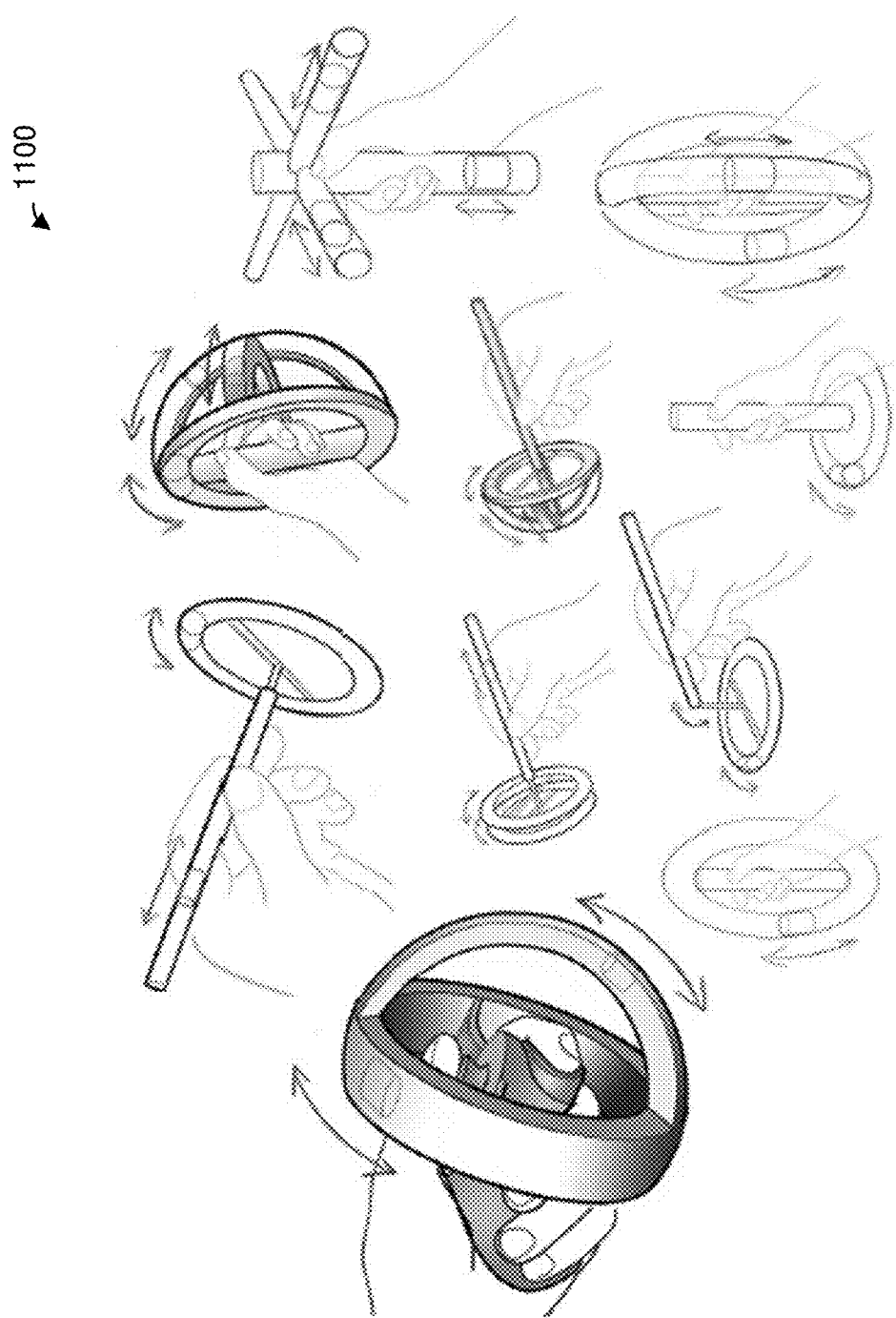
FIG. 11 depicts a variety haptic feedback devices with movable weights, according to various embodiments.

FIG. 11 depicts a variety of haptic feedback devices with movable components (e.g., weights), according to various embodiments. Movable components in FIG. 11 are represented by cylinders shown inside various body portions of the haptic feedback devices, and arrows in FIG. 11 represent directions in which the movable components may be moved to shift a center of gravity of the haptic feedback device. Generally, movable components may be located in or attached to any one or more portions of a haptic feedback device and may shift a center of gravity of the haptic feedback device in 360 degrees and/or anywhere in a 3D space around a user's point of contact with the haptic feedback device, in various embodiments.

Figure 12:
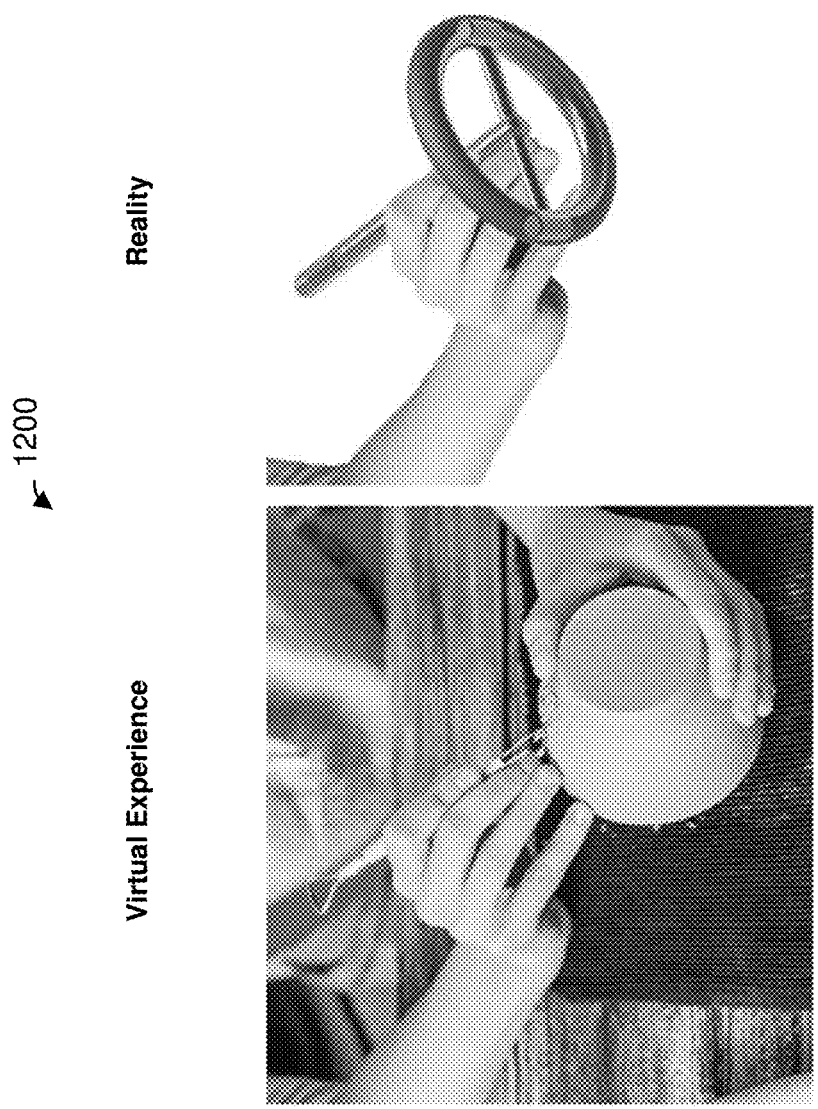
FIG. 12 depicts an exemplary scenario of using a haptic feedback device, according to an embodiment.

FIG. 12 depicts an exemplary scenario 1200 of using a haptic feedback device, according to an embodiment. In the scenario 1200, the haptic feedback device is being used as a chisel tool in a virtual clay sculpting application. In this scenario, as the user presses harder on the clay with the chisel tool in the virtual environment, positions of one or more movable components of the haptic feedback device may be manipulated to shift the center of gravity of the haptic feedback device away from user's point of contact with the haptic feedback device, thereby creating a sensation of greater resistance at the tip of the haptic feedback device. On the other hand, as the user presses more lightly on the clay in the virtual environment, positions of one or more movable components of the haptic feedback device may be manipulated to shift the center of gravity of the haptic feedback device towards the user's point of contact with the haptic feedback device, thereby creating a sensation of less resistance at the tip of the haptic feedback device. Additionally, positions of one or more of the movable components of the haptic feedback device may be dynamically adjusted as described above based on the physical state of the haptic feedback device as the user is moving the haptic feedback device in space, for example to ensure that the sensation imparted on the user does not change with the changing angle at which the haptic feedback device is oriented with respect to a reference plane (e.g., the ground), in some embodiments.

Figure 13:
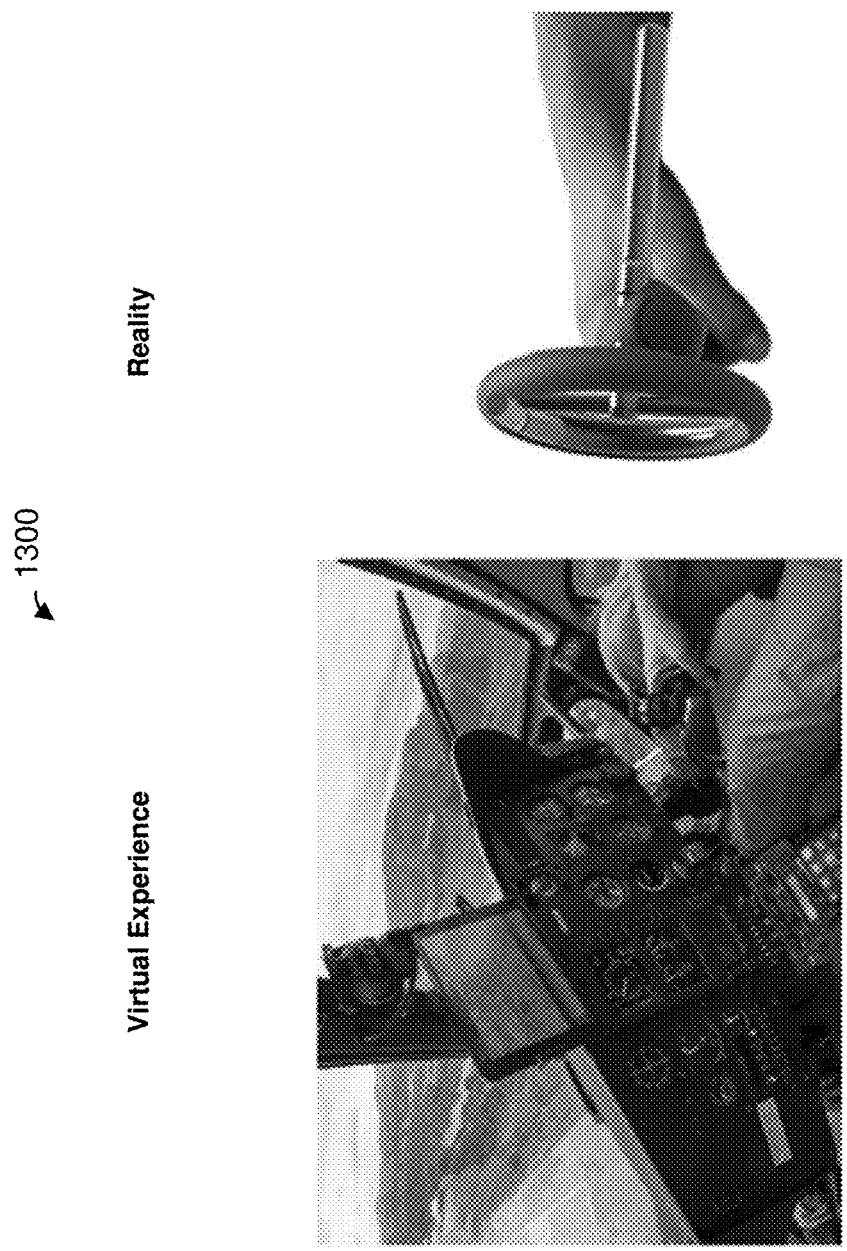
FIG. 13 depicts an exemplary scenario of using a haptic feedback device, according to an embodiment.

FIG. 13 depicts an exemplary scenario 1300 of using a haptic feedback device, according to another embodiment. In the scenario 1300, the haptic feedback device is being used as a steering wheel or control stick in a virtual airplane or helicopter application. In this scenario, as the user is turning the control stick in the virtual environment, positions of one or more movable components of the haptic feedback device may be manipulated to shift the center of gravity of the haptic feedback device away from or towards the user's point of contact (in this case, a handle) with the haptic feedback device in relation to the force that the user is applying to the control stick in the virtual environment, thereby imparting corresponding sensations on the user as the sensations that the user would have felt in the real world. Additionally, positions of one or more of the movable components of the haptic feedback device may be dynamically adjusted (e.g., as described above) based on the physical state of the haptic feedback device as the user is moving the haptic feedback device in space, for example to ensure that the sensation imparted on the user does not change with the changing angle at which the haptic feedback device is oriented with respect to a reference plane (e.g., the ground), in some embodiments.

Figure 14:
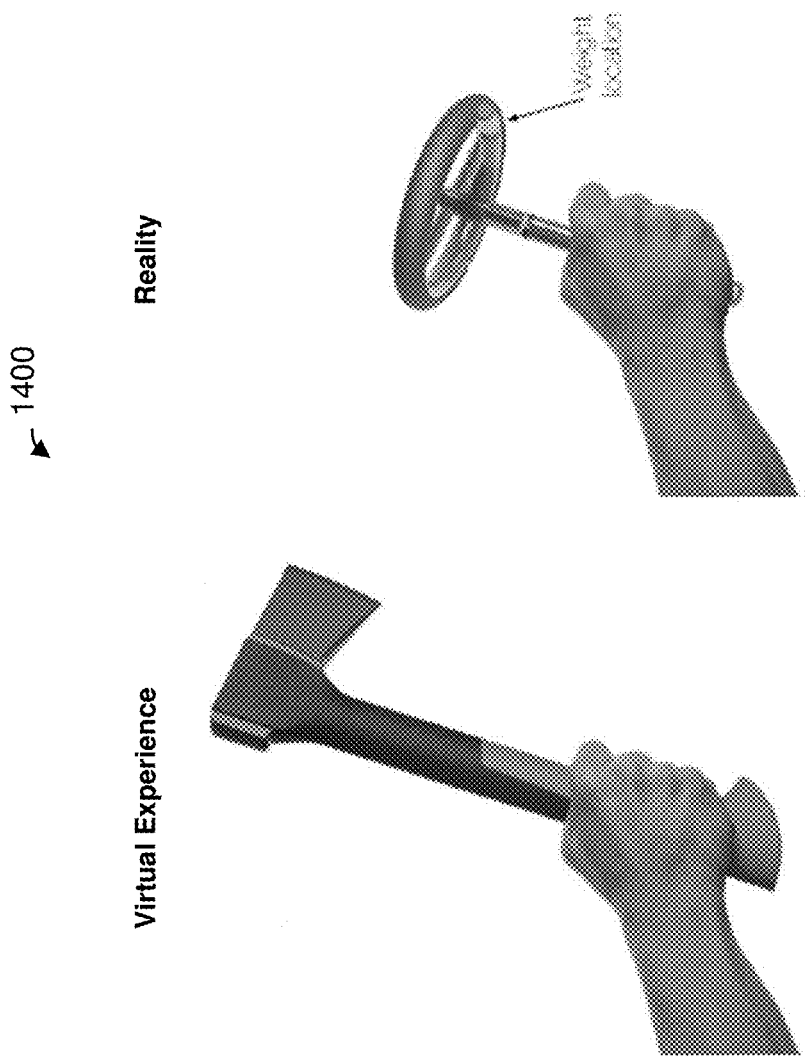
FIG. 14 depicts an exemplary scenario of using a haptic feedback device, according to an embodiment.

FIG. 14 depicts an exemplary scenario 1400 of using a haptic feedback device, according to yet another embodiment. In the scenario 1400, the haptic feedback device is being used as an axe in a virtual environment. In this scenario, positions of one or more movable components of the haptic feedback device may be manipulated to shift the center of gravity of the haptic feedback device away from the user's point of contact with the haptic feedback device, thereby creating a torque at the user's point of contact with the haptic feedback device to simulate a weight of an axe at the tip of the haptic feedback device. In this case, dynamic adjustment of the positions of one or more of the movable components of the haptic feedback device as the user is moving the haptic feedback device in space may not be performed to more realistically simulate the changing sensation that the user would feel if handling an axe in the real world.

Figure 15:
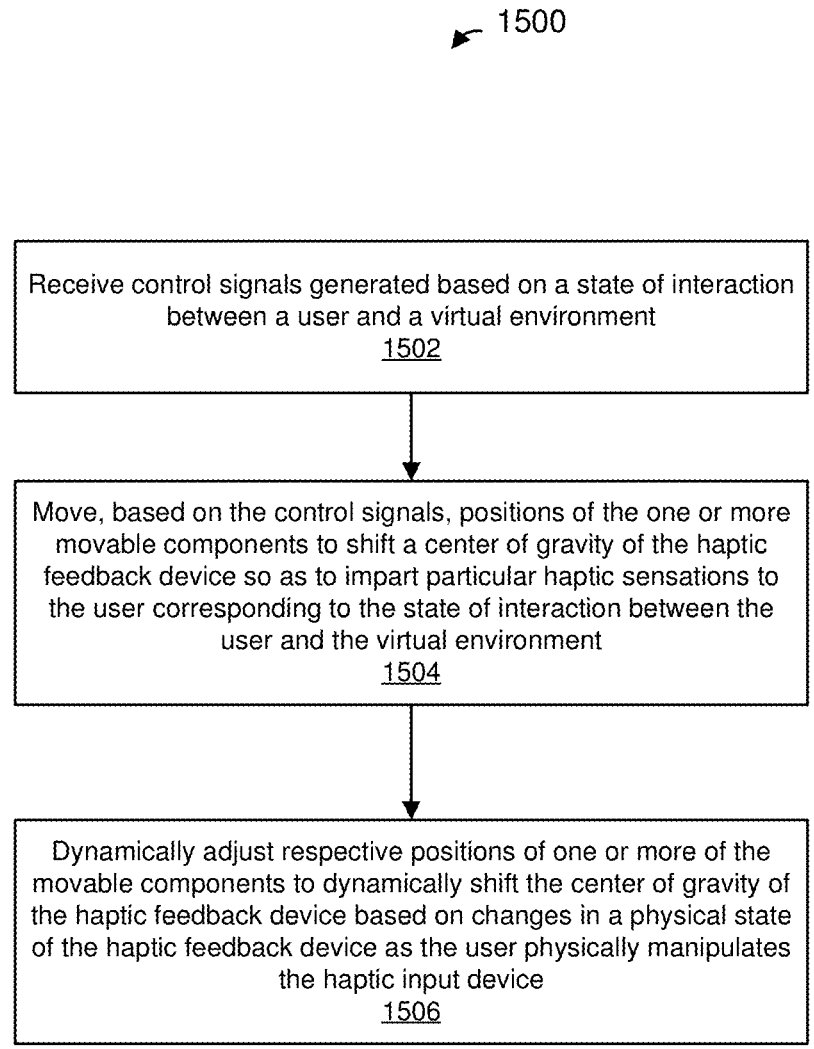
FIG. 15 is a block diagram of a method for operating a haptic feedback device having one or more movable components, according to an embodiment.

FIG. 15 is a block diagram of a method 1500 for operating a haptic feedback device having one or more movable components, according to an embodiment. The method 1500 may be implemented in one of the haptic feedback devices described above with respect to FIGS. 1-14, or may be implemented in any other suitable haptic feedback device.

At block 1502, control signals are received by a controller of the haptic feedback device. In an embodiment, the control signals are received from a processor included in or coupled to the haptic feedback device. In an embodiment, the control signals are generated based on actions performed by a user in a virtual environment. For example, the control signals may be generated based on virtual state signals provided to the processor by a virtual environment device that presents the virtual environment to the user. The virtual state signals may indicate a state of interaction between the user and the virtual environment. The state of interaction between the user and the virtual environment at any given time may be defined, for example, by actions performed by the user in the virtual environment, forces or sensations incurrent or experienced by the user in the virtual environment and/or any other interactive experiences of the user with the virtual environment.

At block 1504, one or more movable components are moved to new positions based on the control signals received at block 1502. Moving one or more movable components at block 1504 based on the control signals received at block 1502 may shift a center of gravity of the haptic feedback device so as to impart, to the user in the real world, particular haptic sensations corresponding to the actions performed by the user in the virtual environment. For example, moving one or more movable components at block 1504 based on the control signals received at block 1502 may shift the center of gravity of the haptic feedback device away from the point of contact of the user with the haptic feedback device to increase a torque felt by the user at the point of contact with the haptic feedback device. Increasing the torque felt by the user may make the haptic feedback device feel heavier for example to simulate the user picking up an object in the virtual environment, or may make the user feel an increasing resistance associated with twisting an object (e.g., a door knob, a steering wheel, etc.) in the virtual environment. As another example, moving one or more movable components at block 1504 based on the control signals received at block 1502 may shift the center of gravity of the haptic feedback device towards the point of contact of the user with the haptic feedback device to decrease a torque felt by the user at the point of contact haptic feedback device. Decreasing the torque felt by the user may make the haptic feedback device feel lighter for example to simulate the user dropping an object in the virtual environment, or may make the user feel a decreasing resistance when the user stops twisting an object in the virtual environment, or reduces a degree to which the object is being twisted in the virtual environment.

At block 1506, respective positions of one or more of the movable components are dynamically adjusted to dynamically shift the center of gravity of the haptic feedback device based on changes in a physical state of the haptic feedback device as the user physically manipulates the haptic feedback device. For example, the respective positions of one or more of the movable components may be dynamically adjusted based on a changing angle at which the haptic feedback device is oriented with respect to a reference plane (e.g., the ground), in an embodiment. In other embodiments, the respective positions of one or more of the movable components may be dynamically adjusted based on other suitable variables of the physical state such as one or more of yaw, pitch, roll, acceleration, speed, position, etc. of the haptic feedback device. In some embodiments, the respective positions of one or more of the movable components may be dynamically adjusted further based on a changing state of interaction between the user and the virtual environment. For example, the respective positions of one or more of the movable components may be dynamically adjusted further based on a changing degree to which an object (e.g., a door knob or a steering wheel) is twisted in the virtual environment, or based on a changing force that is being applied to an object (e.g., a chisel) in the virtual environment.

While the present disclosure has been described in connection with various example structures, configurations, and illustrative implementations, it will be understood by those skilled in the art that other variations and modifications of the structures, configurations, and implementations described above may be made without departing from the scope of the present disclosure. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the present disclosure will be apparent to those skilled in the art from a consideration of the specification or practice of the present disclosure disclosed herein. The elements disclosed in this present disclosure may also be used in conjunction with other haptic technologies currently available and/or not yet conceived, including, but not limited to, acoustic interference, vibration motors, mechanical means, etc.

What is claimed is:

1. A haptic feedback device comprising:
a body having one or more movable components; and
a controller configured to
move the one or more movable components in response to control signals received from a processor, the control signals generated based on a state of interaction between a user and a virtual environment, to shift a center of gravity of the haptic feedback device so as to impart particular haptic sensations to the user corresponding to the state of interaction between the user and the virtual environment, and
dynamically adjust respective positions of one or more of the movable components to dynamically shift the center of gravity of the haptic feedback device based on changes in a physical state of the haptic feedback device as the user physically manipulates the haptic feedback device.

2. The haptic feedback device of claim 1, wherein the controller is configured to dynamically adjust the respective positions of one or more of the movable components based on changes in an angle at which the haptic feedback device is oriented relative to a reference plane so as to maintain the particular haptic sensation as the user physically manipulates the haptic feedback device.

3. The haptic feedback device of claim 1, wherein the dynamic adjustment of the respective positions of one or more of the movable components is enabled or disabled based on a particular type of object being simulated by the haptic feedback device.

4. The haptic feedback device of claim 1, wherein the one or more movable components include one or both of one or more of i) a movable battery pack configured to provide power to the haptic feedback device, ii) a motor configured to redistribute weight of the haptic feedback device and iii) a movable part of a chassis portion of the body of the haptic feedback device, wherein one or more other components are attached to the movable part of the chassis portion.

5. The haptic feedback device of claim 1, further comprising one or more sensors configured to detect one or more of yaw, pitch, roll, acceleration, speed, position and orientation of the haptic feedback device.

6. The haptic feedback device of claim 5, wherein the dynamic adjustment of the respective positions of the one or more of the movable components is determined based on data provided by the one or more sensors.

7. The haptic feedback device of claim 5, wherein the controller is configured to dynamically adjust respective positions of one or more of the movable components to dynamically shift the center of gravity of the haptic feedback device further based on changes in a state of interaction of the user with the virtual environment.

8. A method for operating a haptic feedback device having one or more movable components, the method comprising:
receiving, at a controller of the haptic feedback device from a processor, control signals generated based on a state of interaction between a user and a virtual environment;
moving, with the controller based on the control signals received from the processor, positions of the one or more movable components to shift a center of gravity of the haptic feedback device so as to impart particular haptic sensations to the user corresponding to the state of interaction between the user and the virtual environment; and
dynamically adjusting, with the controller, respective positions of one or more of the movable components to dynamically shift the center of gravity of the haptic feedback device based on changes in a physical state of the haptic feedback device as the user physically manipulates the haptic feedback device.

9. The method of claim 8, wherein dynamically adjusting the respective positions of one or more of the movable components comprises adjusting the respective positions based on changes in an angle at which the haptic feedback device is oriented relative to a reference plane so as to maintain the particular haptic sensation as the user physically manipulates the haptic feedback device.

10. The method of claim 8, wherein the dynamic adjustment of the respective positions of the one or more of the movable components is enabled or disabled based on a particular type of object being simulated by the haptic feedback device.

11. The method of claim 8, wherein the one or more movable components include one or both of one or more of i) a movable battery pack configured to provide power to the haptic feedback device, ii) a motor configured to redistribute weight of the haptic feedback device and iii) a movable part of a chassis portion of the body of the haptic feedback device, wherein one or more other components are attached to the movable part of the chassis portion.

12. The method of claim 8, further comprising detecting, with one or more sensors, one or more of: yaw, pitch, roll, acceleration, speed, position and orientation of the haptic feedback device.

13. The method of claim 12, wherein the dynamic adjustment of the respective positions of the one or more of the movable components is determined based on data provided by the one or more sensors.

14. The method of claim 8, wherein dynamically adjusting the respective positions of the one or more of the movable components to dynamically shift the center of gravity of the haptic feedback device comprises dynamically adjusting the respective positions further based on changes in a state of interaction of the user with the virtual environment.

15. A system, comprising:
a processor coupled to a virtual environment device configured to present a virtual environment to a user, the processor configured generate control signals based on a state of interaction between the user and the virtual environment; and
a haptic feedback device comprising
a body having one or more movable components; and
a controller configured to
move, based on the signals received from the processor, positions of the one or more movable components to shift a center of gravity of the haptic feedback device so as to impart particular haptic sensations to the user corresponding to the state of interaction between the user and the virtual environment, and
dynamically adjust respective positions of one or more of the movable components to dynamically shift the center of gravity of the haptic feedback device based on changes in a physical state of the haptic feedback device as the user physically manipulates the haptic feedback device.

16. The system of claim 15, wherein the processor is configured to
receive a virtual environment signal from the virtual environment device, the virtual environment signal indicative of the state of interaction between the user and the virtual environment,
determine, based on the received virtual environment signal, the positions at which the one or more movable components are to be placed to shift the center of gravity of the haptic feedback device.

17. The system of claim 15, further comprising one or more sensors configured to detect one or more of yaw, pitch, roll, acceleration, speed, position and orientation of the haptic feedback device.

18. The system of claim 17, wherein the dynamic adjustment of the respective positions of the one or more of the movable components is determined based on data provided by the one or more sensors.

19. The system of claim 15, wherein the one or more movable components of the haptic feedback device include one or more of i) a movable battery pack configured to provide power to the haptic feedback device, ii) a motor configured to redistribute weight of the haptic feedback device and iii) a movable part of a chassis portion of the body of the haptic feedback device, wherein one or more other components are attached to the movable part of the chassis portion.

20. The system of claim 15, wherein the controller is configured to dynamically adjust respective positions of one or more of the movable components to dynamically shift the center of gravity of the haptic feedback device further based on changes in a state of interaction of the user with the virtual environment.

* * * * *